Aug. 27, 1968 W. C. KENT 3,399,099

APPARATUS FOR WRAPPING TAPE AROUND A SUPPORT

Filed Aug. 12, 1963 3 Sheets-Sheet 1

INVENTOR.
W.C. KENT
BY S. Gundersen.
ATTORNEY

APPARATUS FOR WRAPPING TAPE AROUND A SUPPORT

Filed Aug. 12, 1963 3 Sheets-Sheet 3

United States Patent Office 3,399,099

Patented Aug. 27, 1968

3,399,099

APPARATUS FOR WRAPPING TAPE AROUND A SUPPORT

William C. Kent, Gahanna, Ohio, assignor to Western Electric Company, Incorporated, New York, N.Y., a corporation of New York Filed Aug. 12, 1963, Ser. No. 301,402
13 Claims. (Cl. 156—479)

ABSTRACT OF THE DISCLOSURE

An apparatus for wrapping a plastic carrier tape, having spaced copper strips bonded to one surface thereof, around a flat support board composed of a nonconductive material.

This invention relates to apparatus for wrapping tape around a support and particularly relates to apparatus for feeding a continuous tape having an adhesive surface into engagement with a board and thereafter wrapping the adhesive surface around the board.

*Background of invention*

In the manufacture of memory units utilized in various electronic equipment, it is frequently necessary to wrap a plastic carrier tape about a flat board for subsequent use in the memory units wherein the tape has an adhesive backing on one surface and a series of spaced metallic strips on the opposite surface. The alignment of such metallic strips with the flat board is extremely critical in view of the subsequent use of the units; therefore, apparatus must be provided for applying the tape to the board in such a way that the critical alignment of the strips relative to the board is accomplished.

*Summary of the invention*

It is, therefore, an object of this invention to provide apparatus for aligning and wrapping adhesive-backed tape about a support board.

With this and other objects in view, this invention contemplates apparatus for drawing a tape having an adhesive backing from a tape supply and over an aligning means, whereby spaced copper strips attached to the nonadhesive surface of the tape are guided over a platen and thereafter attached at the leading end thereof to a gripping means. A flat board is positioned upon the exposed adhesive surface of the portion of the tape resting on the platen, and subsequently the aligning means is guided over the board, thereby drawing and carrying trailing portions of the tape from the supply over the board and pressing the adhesive surface of the tape into gripping engagement with the flat surfaces of the board.

Other objects and advantages of the invention will be more readily understood from the following detailed description of apparatus when read in conjunction with the appended drawings.

*Detailed description*

Figure 2:
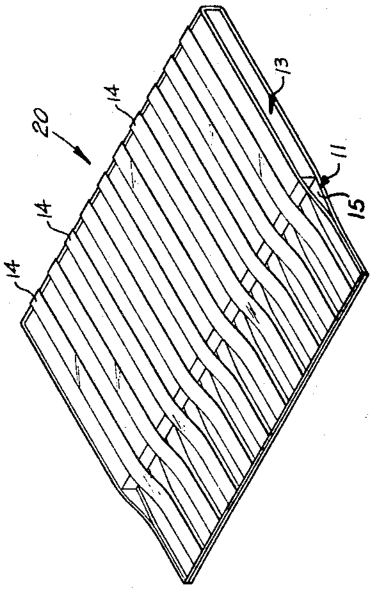
FIG. 2 is a perspective view showing a tape having an adhesive surface in engagement with a flat support board wherein the tape has spaced parallel copper strips deposited on the opposite surface thereof.

Referring to FIG. 2, the present invention contemplates apparatus for aligning and wrapping a tape, designated generally by the reference numeral 11, such as that sold under the tradename "Mylar," having an adhesive surface 15 about a board, designated generally by the reference numeral 13, composed of a nonconductive material, to form a completed wrapped assembly, designated generally by the reference numeral 20. The outer surface of the tape 11 is provided with a plurality of parallel spaced copper strips 14. It is noted that the adhesive surface 15 of the tape 11 adheres to the surfaces of the board 13 as shown and the ends of the tape are brought together whereby one end portion of the adhesive surface engages and adheres to the opposite end portions of the adhesive surface.

Figure 1:
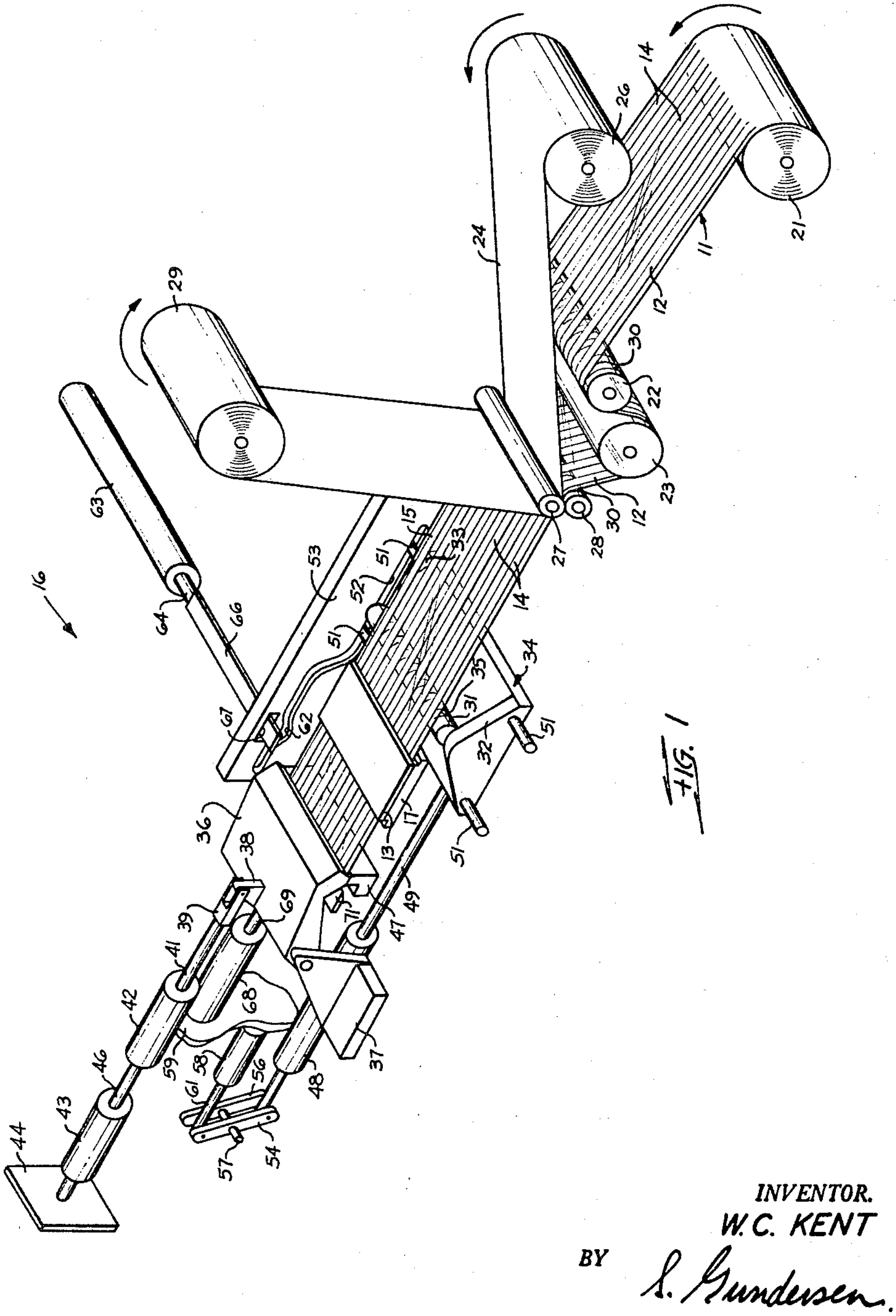
FIG. 1 is a perspective view showing the apparatus of the invention whereby adhesive tape is fed into engagement with the flat support board.

As shown in FIG. 1, a wrapping apparatus, generally designated by the reference numeral 16, is provided with a manually reciprocable platen 17 for receiving the flat board 13 thereon. The tape 11, having the copper strips 14, is fed from a supply roll 21 between a pair of rollers 22 and 23 and into engagement with an adhesive transfer tape 24 which is fed from a supply roll 26. The tape 24 is provided with an adhesive surface which engages an exposed plain surface 12 of the tape 11 as the tapes pass between a pair of opposed press rollers 27 and 28, whereby the adhesive material of the tape 24 is deposited on the exposed plain surface of the tape 11 to provide the adhesive surface 15. It is noted that the rollers 22 and 28 are formed with a plurality of spaced circumferential grooves 30 about the periphery thereof for receiving the copper strips 14 attached to the tape 11. In this manner the tape 11, which is drawn from the supply 21, is maintained in a desired aligned orientation.

Thereafter, the tape 24 is drawn onto a take-up roll 29 and the tape 11 is fed over a roller 31 which is rotatably supported between a pair of spaced flanges 32 and 33 of a support, designated generally by the reference numeral 34. The roller 31 is formed with a plurality of spaced, circumferential grooves 35 about the periphery thereof for receiving the copper strips 14 of the tape 11 as the tape is fed over the roller. In this manner the tape 11 is aligned during the operation wherein the tape is drawn from the tape supply 21, thereby assuring proper alignment of the tape during the wrapping operation.

The leading end of the tape 11 is further drawn over the upper surface of the platen 17 and is positioned on an anvil 47, wherein the copper strips 14 of the tape are received by spaced grooves (not shown) formed in the upper surface of the anvil. Thus it is seen that the tape 11 is maintained in a desired aligned orientation from the tape supply 21 to the anvil 47 by the cooperation of the copper strips 14 of the tape with the grooves of the respective rollers 22, 28 and 31 and the anvil 47.

An overhead pivotal clamp 36 is pivotally attached to a flanged support 37 and is provided with a central extension 38 which is pivotally attached to a yoke 39. The yoke 39 is attached to a piston rod 41 which extends from an air cylinder 42. An air cylinder 43 is pivotally attached to a fixed support plate 44 and has a piston rod 46 extending therefrom which is attached to the air cylinder 42. Upon cooperative movement of the air cylinders 42 and 43, the clamp 36 is pivoted downwardly to engage the leading end of the adhesive surface 15 of the tape 11 and clamp the leading end against the fixed anvil 47. Thereafter the flat board 13 is manually positioned on the portion of the adhesive surface 15 of the tape 11 which is resting on the platen 17.

An air cylinder 48 is provided with a piston rod 49 extending from one end thereof which is attached to the support 34 for urging the roller 31 up and over the flat board 13, whereby the trailing portion of the tape 11 is carried with the roller so that the adhesive surface 15 engages and is adhered to the upper surface of the board. The support 34 is provided with pairs of pins 51 which extend outwardly from opposite sides of the support adjacent to the flanges 32 and 33.

The pins 51 extend into a cam slot 52 formed in each of a pair of opposed spaced cam plates 53 (one shown) wherein the cam slots cooperate with the pins and the air cylinder 48 to guide and urge the roller 31, with the trailing portion of the tape 11, over the flat board 13 resting on the platen 17. In addition, as the roller 31 carries the tape 11 over the board 13, the grooves 35 of the roller maintain aligning engagement with the copper strips 14 of the tape to assure continued and desired alignment of the tape relative to the flat board 13 during the wrapping operation. Further, as the roller 31 passes over the flat board 13, the roller presses the underside of the board against the adhesive surface 15 of the portion of the tape resting on the platen 17 and also presses the adhesive surface of the carried portion of the tape against the upper surface of the board, thereby simultaneously pressing both flat surfaces of the board against the adhesive surface of the tape.

The opposite end of the air cylinder 48 is pivotally attached to one end of a pair of spaced lever arms 54 and 56 which are rocked about a fixed rod 57 intermediate the ends thereof. An air cylinder 58 is fixedly attached to a fixed plate 59 and is provided with a piston rod 61 extending therefrom where the free end of the piston rod is pivotally attached to the opposite ends of the lever arms 54 and 56. The air cylinder 58 provides additional movement of the support 34 and the roller 31 in the wrapping operation, whereby the pairs of pins 51 are guided within and beyond a dip 62 in the cam slots 52 so that the roller presses the trailing portion of the adhesive surface 15 of the tape 11 against the leading portion of the adhesive surface of the tape.

An air cylinder 63 is provided with a piston rod 64 having a shear blade 66 attached to the free end thereof to provide longitudinal reciprocable movement of the blade through an opening 67 formed in one of the cam plates 53. An air cylinder 68 is fixedly attached to the fixed plate 59 and is provided with a piston rod 69 having a shear blade 71 transversely attached to the free end thereof, whereby the shear blade 71 cooperates with the shear blade 66 to sever the wrapped tape 11 from the tape supply 21.

Initially the tape 11 is passed into engagement with adhesive transfer tape 24, whereby adhesive material is transferred and deposited on the exposed surface 12 of the tape 11 to form the adhesive surface 15 and the tape is thereafter passed over the grooves 35 of the roller 31 and the platen 17 and positioned in aligning engagement with the grooves of the anvil 47. Subsequently, the overhead clamp 36 is lowered by the cooperation of the forward movement of both air cylinders 42 and 43 to adhesively engage the leading end of the adhesive surface 15 of the tape 11 and to clamp the tape against the anvil 47. In this manner an intermediate portion of the tape 11 is resting on the platen 17 with the adhesive surface 15 exposed. Thereafter, an operator manually positions the board 13 on the portion of the adhesive surface 15 of the tape 11 which is resting on the platen 17. It is noted that the positioning of the various rollers 22, 28 and 31 and the anvil 47 with their respective grooves orient the tape 11 in a desired alignment relative to the platen 17 by engagement with the copper strips 14, thereby facilitating the initial manual positioning of the board 13 on the adhesive surface 12 of the tape resting on the platen.

Figure 4:
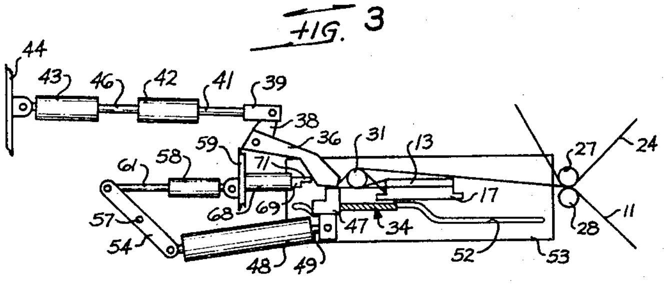

Referring to FIG. 4, the air cylinders 42 and 43 have been actuated, as previously mentioned, to pivotally urge the overhead clamp 36 downwardly whereby the leading end of the adhesive surface of the tape 11 is adhesively engaged and clamped against the anvil 47. It is noted that this is the furtherest downward movement of the clamp 36 which is accomplished by the cooperative action of the air cylinders 42 and 43. Thereafter, the air cylinder 48 is actuated to draw the piston rod 49 within the air cylinder whereby the support 34 is moved up and over the board 13 due to the cooperation of the pairs of pins 51 on the support and the cam slots 52 of the cam plates 53. In this manner the roller 31 draws a trailing portion of the tape 11 from the tape supply 21 and carries the trailing portion of the tape over the board 13, thereby guiding the tape by the cooperation of the copper strips 14 and the roller grooves 35. In addition, the roller 31 presses the underside of the board 13 against the adhesive surface 15 of the portion of the tape 11 resting on the platen 17, and also presses the adhesive surface of the trailing portion of the tape against the upper surface of the board 13.

Slight continued movement of the roller 31 urges the roller from the board 13 and presses the opposed adhesive surfaces 15 of the leading and trailing portions of the tape 11 together, whereafter the roller comes to rest, as shown ine FIG. 4. Thereafter the air cylinders 42 and 43 are reactuated to pivot the overhead clamp 36 upwardly to its uppermost limit. In view of the positioning of the roller 31 adjacent to the anvil 47, the clamp 36 becomes disengaged from the leading end of the tape 11 as the clamp is pivoted upwardly.

Figure 5:
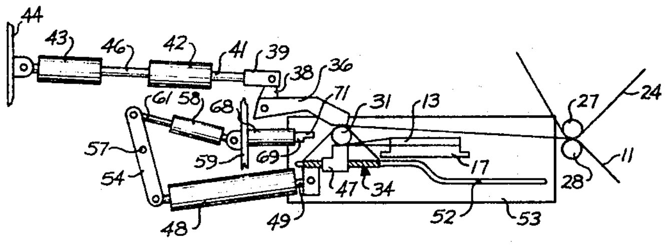

As viewed in FIG. 5, the air cylinder 58 is operated to draw the piston rod 61 within the cylinder whereby the lever arms 54 and 56 are pivoted about the fixed pin 57 so that additional movement is provided for the support 34. In this manner the pins 51 are guided through the dip 62 of the cam slots 52, whereby the roller 31 continues to press the trailing portion of the adhesive surface 15 of the tape 11 against the leading portion of the adhesive surface of the tape resting on the anvil 47. Thereafter, the air cylinder 42 is actuated to pivot the overhead clamp 36 downwardly through a partial path of full movement, whereby the underside of the clamp engages the adhesive surface 15 of the trailing portion of the tape 11 resting on the upper surface of the roller 31. In this manner the clamp 36 adhesively engages the trailing portion of the tape 11. It is noted that by actuation of air cylinder 42, limited downward movement is provided for the pivotal clamp 36. It is further noted that the grooves 35 of the roller 31 retain the copper strips 14, and hence the tape 11, in a desired alignment during the wrapping procedure and further position the tape in proper alignment relative to the overhead clamp 36.

Figure 6:
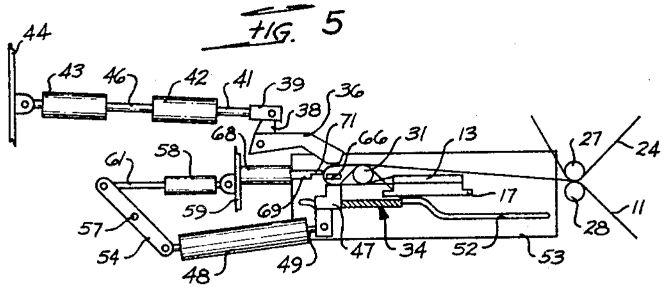

Subsequently, as viewed in FIG. 6, the air cylinder 58 is reversed to move the roller 31 back slightly away from engagement with the anvil 47 to reveal an intermediate section of the tape 11 extending between and adhered to the anvil 47 and the overhead clamp 36. Thereafter the air cylinder 63 is actuated to urge the shear blade 66 into a position within a space formed between the anvil 47 and the overhead clamp 36. The air cylinder 68 is actuated to urge the transverse shear blade 71 toward the intermediate section of tape 11 which stretches between the anvil 47 and the overhead clamp 36, whereby the shear blades 66 and 71 cooperate to shear the stretched tape so that the tape wrapped around the board 13 is severed from the tape extending from the supply 21.

Figure 3:
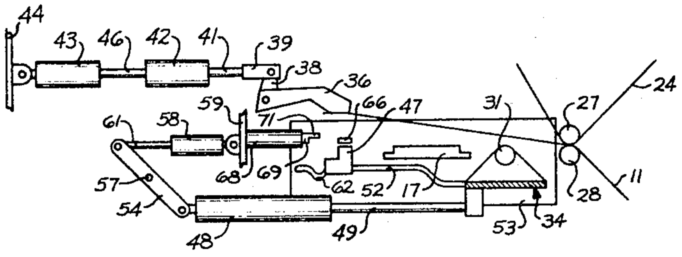
FIGS. 3 through 6 are diagrammatical views of step-by-step operation of the apparatus shown in FIG. 2.

Thereafter the air cylinders 63 and 68 are reversed to withdraw the shear blades 66 and 71, respectively, from the shear area and the air cylinder 48 is operated to return the support 34 and the roller 31 to a normal position of rest, as shown in FIG. 3. Further, the air cylinder 42 is operated to pivot the overhead clamp 36 upwardly to raise the extended portion of the new leading end of the tape 11 from the assembly area. The operator then manually moves the platen 17 away from the assembly area and removes the completed product from the platen. The platen 17 is then returned to the assembly position wherein a new assembly cycle is initiated.

Figure 8:
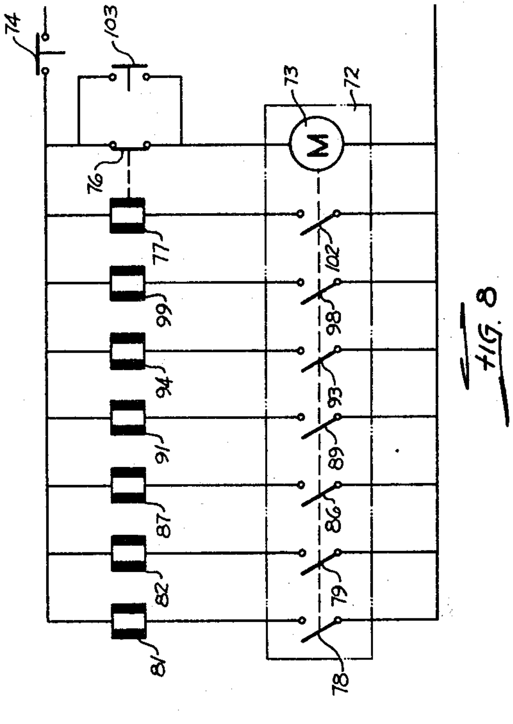
FIG. 8 is an electrical schematic showing a control circuit for controlling the operation of the pneumatic system.

As shown in FIG. 8, an electrical timing unit 72 is provided with a timing motor 73 for rotating a series of cams (not shown) to control a plurality of cam-actuated switches 78, 79, 86, 89, 93, 98 and 102. Initially, the operator closes a switch 74 whereby electrical energy is supplied to the motor 73 through a normally closed contact 76 controlled by a coil 77 of a relay, whereby the motor is operated. As the cams are rotated, the cam-actuated switches 78 and 79 are simultaneously closed to simultaneously actuate a pair of solenoids 81 and 82, respectively.

Figure 7:
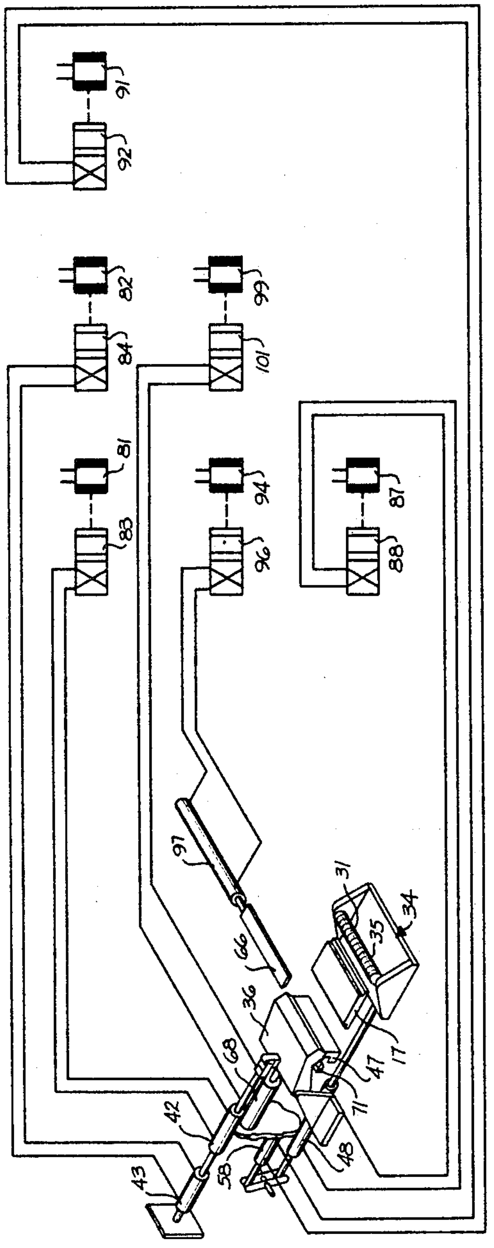
FIG. 7 is a view showing a pneumatic control system for operating the apparatus.

Referring to FIG. 7, as the solenoids 81 and 82 are actuated, a pair of valves 83 and 84, respectively, are operated to supply pneumatic pressure to the air cylinders 42 and 43, respectively, to pivot the overhead clamp 36 to clamp the leading end of the tape 11 against the anvil 47. In this manner, the previously attached leading end of the tape 11 is lowered onto the upper surface of the platen 17, as previously described. Thereafter the operator manually positions the board 13 on the adhesive surface 15 of the portion of tape 11 which rests on the platen 17.

Referring again to FIG. 8, as the motor 73 continues to operate, the cam-controlled switch 86 is closed to actuate a solenoid 87, whereby a valve 88 is opened. As the valve 88 is opened, pneumatic pressure is applied to the air cylinder 48, as viewed in FIG. 7 to move the roller 31 over the board 13 in the manner previously described. The switches 78 and 79 (FIG. 8) are thereafter simultaneously cammed open to deactuate the solenoids 81 and 82, thereby closing the valves 83 and 84 so that the air cylinders 42 and 43 are deactuated to raise the overhead clamp 36. Thereafter a switch 89 (FIG. 8) is closed to actuate a solenoid 91, whereby a valve 92 is opened to supply pneumatic pressure to the air cylinder 58 to operate the air cylinder, to provide the additional movement of the roller 31, so that the adhesive surface 15 of the trailing portion of the tape 11 is pressed against the adhesive surface of the leading portion of the tape on the anvil 47.

Subsequent to the pressing together of the leading and training portions of the tape 11, the switch 78 (FIG. 8) is cammed closed to actuate the solenoid 81, thereby opening the valve 83 so that the air cylinder 42 is operated to lower the overhead clamp 36 into engagement with the adhesive surface 15 of the tape 11 resting on the upper portion of the roller 31. The switch 89 (FIG. 8) is then cammed open to deactuate the solenoid 91, whereby the valve 92 is closed, thereby removing the pneumatic pressure from the air cylinder 58. In this manner, the roller 31 is moved away from the area between the overhead clamp 36 and the anvil 47 so that a portion of the tape 11 stretches between and adhesively adheres to the anvil and the clamp.

A cam-actuated switch 93 (FIG. 8) is then closed to actuate a solenoid 94, whereby a valve 96 is opened to supply pneumatic pressure to an air cylinder 97. As the air cylinder 97 is operated, the shear blade 66 is positioned adjacent to the portion of the nonadhesive surface of the tape 11 which stretches between the spaced clamp 36 and the anvil 47. Thereafter a cam-actuated switch 98 (FIG. 8) is closed to actuate a solenoid 99, thereby opening a valve 101 to supply penumatic pressure to the air cylinder 68. In this manner, the shear blade 71 is moved into engagement with an intermediate portion of the adhesive surface 15 of the tape 11 and stretches between the clamp 36 and the anvil 47 and thereafter cooperates with the shear blade 66 to sever the portion of tape wrapped around the board 13 from that portion of tape which extends from the supply 21. Subsequently, the switch 98 (FIG. 8) is opened whereby the valve 101 is closed to withdraw the blade 71 from the shearing area. In addition, the switch 93 (FIG. 8) is opened to deactuate the solenoid 94 whereby the valve 96 is closed to withdraw the shear blade 66 from the shear area.

Thereafter, the switches 78 and 86 (FIG. 8) are opened to close the valves 84 and 88, respectively, so that the roller 31 and the overhead clamp 36 are moved to a normal rest position. Referring to FIG. 8, upon continued operation of the motor 73, a switch 102 is cam closed to operate the relay coil 77, whereby the relay contact 76 is opened to stop the timer motor 73, thereby completing the automatic cycle of operation. Thereafter, as previously described, the operator removes the platen 17 from the assembly area. The operator then slides the platen 17 away from the assembly area and removes the completed wrapped assembly 20 (FIG. 2) from the top of the platen and returns the platen to the assembly area for a subsequent atomatic cycle of assembly.

In order to initiate a new cycle, the operator depresses a normally open, manually-operated switch 103, as viewed in FIG. 8, whereby electrical energy is supplied to the motor 73 to operate the motor sufficiently long enough to cam open the switch 102, thereby permitting the release of the contact 76 from the coil 77 and providing a closed circuit for the motor operation during the next cycle.

It is to be understood that the above-described arrangements are simply illustrative of the principles of the invention. Other arrangements may be devised by those skilled in the art which will embody the principles of the invention and fall within the spirit and scope thereof.

What is claimed is:

1. Apparatus for aligning and wrapping about a flat article an adhesive-backed tape having longitudinal spaced metal strips on a nonadhesive surface, wherein the tape is drawn from a tape supply, which comprises:

means spaced from the tape supply for engaging the leading end of the tape as the tape is drawn from the supply to hold a portion of the tape between the tape supply and the engaging means, an anvil cooperating with the engaging means to receive and clamp the engaged leading end of the tape therebetween, a first means for moving the engaging means with the held end of the tape into engagement with the anvil, whereby the leading end of the tape is clamped between the engaging means and the anvil, a platen positioned between the tape supply and the engaging means for supporting an intermediate portion of the tape extending between the tape supply and the engaging means with the adhesive surface exposed to receive the flat article thereon, means for carrying and aligning successive trailing portions of the tape extending between the platen and the tape supply over the flat article and toward the clamped leading end of the tape, a first means for moving the tape carrying and aligning means over the platen and to a position between the platen and the anvil so that the adhesive surface of successive portions of the carried tape engage and adhere to the exposed surface of the flat article, the first means for moving the engaging means withdrawing the engaging means from the position in engagement with the anvil so that when the engaging means is withdrawn the presence of the carrying means adjacent to the anvil causes the engaging means to become disengaged from the leading end of the adhesive surface of the tape which rests on the anvil, a second means for moving the tape carrying and aligning means from the position between the platen and the anvil to a position in engagement with the anvil so that the adhesive surface of the leading end of the tape resting on the anvil is pressed into engagement with the adhesive surface of a trailing section of the tape carried by the carrying means, a second means for moving the engaging means from a position adjacent to and spaced from the tape carrying means to a position in engagement with the adhesive surface of the trailing portion of the tape resting on the carrying means and spaced from the trailing portion of the tape adhesively engaged with the leading portion of the tape on the anvil with the carrying means positioned between the engaging means and the anvil, the second moving means for the tape-carrying means withdrawing the carrying means from the position between the anvil and the engaging means and away from the portion of the tape held between the spaced engaging means and the anvil so that a portion of the tape extends from the spacially positioned anvil and engaging means, and means for severing the portion of tape extending between the spaced anvil and the engaging means so that the flat article with the severed tape wrapped thereabout can be removed from the platen independent of the tape supply.

2. The apparatus of claim 1, wherein the engaging means comprises a support and a pivotally mounted arm having a surface at the free end thereof for engaging the adhesive surface of the tape.

3. The apparatus of claim 1, wherein the first means for moving the engaging means comprises:

a support, a first air cylinder fixedly attached to the support having a piston rod extending therefrom, a second air cylinder fixedly attached to the free end of the piston rod of the first air cylinder, a piston rod extending from the second air cylinder and attached at the free end thereof to the engaging means, and means for actuating the first and the second air cylinders to move the engaging means a predetermined distance into engagement with the anvil so that the leading end of the tape is clamped between the engaging means and the anvil.

4. The apparatus of claim 1, wherein the carrying means comprises:

a movable support, and a roller mounted on the support for rotation, where upon movement of the support the roller draws the trailing portion of the tape from the tape supply and carries the trailing portion of the tape over the flat article and presses the adhesive surface of the tape against the flat article, and further presses the adhesive surface of the leading end of the tape against the adhesive surface of the trailing portion of the tape.

5. The apparatus of claim 4, wherein the support has pins projecting therefrom and extending into cam slots formed in fixed members adjacent to the support for guiding the support and the roller over the flat article.

6. The apparatus of claim 1, wherein the means for aligning the trailing portion of the tape being drawn from the supply comprises:

a movable support, and a roller mounted for rotation on the support, the roller being formed with a plurality of spaced circumferential grooves for receiving the longitudinal spaced metal strips of the tape therein where, upon movement of the roller, a trailing portion of the tape is drawn from the tape supply and guided over the flat article is a desired alignment by the cooperation of the metal strips of the tape with the grooves of the roller.

7. The apparatus of claim 1, wherein the first means for moving the tape carrying and aligning means comprises:

an air cylinder, a piston rod extending from the air cylinder attached to the carrying means, and means for actuating the air cylinder to move the carrying means a predetermined distance to carry and press the adhesive surface of the tape into engagement with the flat article.

8. The apparatus of claim 1, wherein the second means for moving the tape-carrying means includes:

a support, an air cylinder fixedly attached to the support, a piston rod extending from the air cylinder, means for attaching the free end of the piston rod to the first means for moving the tape-carrying means, and means for actuating the air cylinder to move the first means for moving the carrying means which moves the carrying means a predetermined distance so that the adhesive surface of the leading end of the tape is pressed into engagement with the adhesive surface of the carried trailing portion of the tape.

9. The apparatus of claim 1, wherein the second means for moving the engaging means comprises:

a support, an air cylinder attached to the support, a piston rod extending from the air cylinder attached to the engaging means, and means for actuating the air cylinder to move the engaging means a predetermined distance to engage and hold the adhesive surface of a trailing portion of the tape resting on the carrying means.

10. The apparatus of claim 1, wherein the means for severing the intermediate portion of the tape comprises:

a first air cylinder having a piston rod extending therefrom, a first shear blade attached to the free end of the piston rod of the first air cylinder and extending axially therefrom, means for actuating the first air cylinder to move the first shear blade so that the first shear blade is positioned adjacent to the nonadhesive surface of the portion of tape extending between the spaced anvil and the engaging means, a second air cylinder having a piston rod extending therefrom, a second shear blade attached transversely to the free end of the piston rod of the second air cylinder and positioned adjacent to the adhesive surface of the portion of tape extending between the spaced anvil and the engaging means, and means for actuating the second air cylinder to move the second shear blade into engagement with the adhesive surface of the portion of the tape extending between the spaced anvil and the engaging means to cooperate with the first shear blade to sever the portion of tape extending between the spaced anvil and the engaging means.

11. Apparatus for wrapping a tape about a flat article wherein the tape is provided with an adhesive surface and a nonadhesive surface and is drawn from a tape supply, which comprises:

a pivotal arm for engaging and adhesively holding the leading end of the adhesive surface of the tape, a platen positioned between the tape supply and the pivotal arm for receiving an intermediate portion of the nonadhesive surface of the tape, means for moving the pivotal arm with respect to the platen to position the nonadhesive surface of the intermediate portion of the tape on the platen so that the flat article may be positioned on the adhesive surface of the tape atop the platen, a roller positioned between the tape supply and the platen, for engaging successive portions of the nonadhesive surface of the tape between the tape supply and the platen to carry the tape over the flat article so that the adhesive surface of the successive portions of the tape engage the exposed surface of the flat article, a first means for moving the roller into engagement with the successive portions of the nonadhesive surface of the tape to carry the tape over the flat article to a position adjacent to the pivotal arm so that the unexposed surfaces of the article is pressed into adhesive engagement with the adhesive surface of the portion of the tape resting on the platen and the adhesive surface of the successive portions of the tape carried by the roller are pressed into adhesive engagement with the upper surface of the flat article, means for moving the pivotal arm away from engagement with the adhesive surface of the leading end of the tape with the roller holding the leading end of the tape so that the arm releases the tape, a second means for moving the roller into a position over the leading end of the tape with the adhesive surface of the leading end moved into engagement with the adhesive surface of a trailing portion of the carried tape, means for moving the pivotal arm into engagement with the adhesive surface of the portion of tape resting on the roller and spaced from the trailing portion of the tape, the second roller moving means withdrawing the roller to a position between the pivotal arm and the platen to provide a portion of the tape extending between the roller and the pivotal arm, and means for severing the portion of the tape extending between the roller and the pivotal arm so that the tape wrapped about the flat article can be removed from the platen with the article and the leading end of the severed portion extending from the tape supply is adhesively attached to the pivotal arm for a subsequent wrapping cycle.

12. Apparatus for wrapping an adhesively backed tape drawn from a tape supply about a flat article, which comprises:

a clamp spaced from the tape supply for adhesively engaging the leading end of the adhesive surface of the tape, an anvil spatially positioned adjacent to the clamp, a platen positioned between the clamp and the tape supply for receiving a nonadhesive surface of an intermediate portion of the tape with the adhesive surface exposed to receive the flat article thereon, a first means for moving the clamp into engagement with the anvil so that the leading end of the tape in adhesive engagement with the clamp is clamped therebetween, a roller positioned between the supply and the platen adjacent to the nonadhesive surface of the portion of the tape extending between the tape supply and the platen, a first means for moving the roller into engagement with the nonadhesive surface of the portion of tape extending between the tape supply and the platen and over the flat article on the portion of tape resting on the platen, so that successive portions of the tape between the supply and the platen are carried over the flat article toward the clamp, means for guiding the roller over the tape and the flat article so that the portions of the adhesive surface of the tape which are in engagement with the flat surfaces of the article are pressed firmly into bonding engagement with the flat surfaces, the first means retracting the clamp to a position spaced from the anvil with the leading end of the tape being held by the roller at a position adjacent to the anvil, a second means for moving the roller over a trailing portion of the tape and onto the anvil with the adhesive surface of the trailing portion of the tape pressed into engagement with the adhesive surface of the leading end of the tape, a second means for moving the clamp towards the roller to position the roller between the clamp and the anvil so that the clamp adhesively engages the adhesive surface of a portion of the tape resting on the surface of the roller and spaced from the portion of the tape positioned between the anvil and the roller, the second means retracting the roller from between the spaced anvil and clamp to provide a portion of the tape extending between the anvil and the clamp, and means for severing the portion of the tape extending between the anvil and the clamp so that the portion of tape wrapped around the flat article is severed from the supply and the leading end extending from the supply is attached to the clamp.

13. Apparatus for wrapping an adhesive-backed surface of a tape about a flat article wherein the tape is drawn from a tape supply, which comprises:

means spaced from the tape supply for engaging the leading end of the adhesive surface of the tape, a platen positioned between the tape supply and the engaging means so that when the leading end of the tape is held by the engaging means an intermediate portion of the tape is positioned over the platen whereafter the flat article may be positioned atop and adhered to the exposed adhesive surface of the portion of the tape resting on the platen, means normally interposed between the tape supply and the platen for carrying successive portions of the tape extending between the tape supply and the platen over the exposed surface of the flat article, means for moving the carrying means through a path over the surface of the platen which supports the flat article and over the exposed surface of the flat article with successive portions of the tape being carried over the flat article toward the clamped leading end of the tape so that the adhesive surface of the successive portions of the carried tape engages and adheres to the exposed surface of the flat article, means for holding spaced sections of a portion of the tape extending between a trailing portion of the wrapped tape and the tape supply, and means for severing the extended held portion of the tape so that the portion of the tape wrapped about the flat article is severed from the portion of the tape extending from the supply.

References Cited

UNITED STATES PATENTS

| | | | |
|---|---|---|---|
| 2,109,583 | 3/1938 | Bennett | 161—82 |
| 2,813,052 | 11/1957 | Lancaster | 161—88 |
| 3,082,292 | 3/1963 | Gore | 174—117 |
| 3,164,937 | 1/1965 | Ingram | 53—389 X |

EARL M. BERGERT, *Primary Examiner.*

H. F. EPSTEIN, *Assistant Examiner.*